(12) United States Patent
Eddisford

(10) Patent No.: US 8,956,111 B2
(45) Date of Patent: Feb. 17, 2015

(54) ASSEMBLY FOR MOUNTING A COMPONENT CENTERED TO AN OPENING

(71) Applicant: Lucien Eddisford, Arcata, CA (US)

(72) Inventor: Lucien Eddisford, Arcata, CA (US)

( * ) Notice: Subject to any disclaimer, the term of this patent is extended or adjusted under 35 U.S.C. 154(b) by 86 days.

(21) Appl. No.: 13/859,945

(22) Filed: Apr. 10, 2013

(65) Prior Publication Data

US 2014/0312201 A1 Oct. 23, 2014

Related U.S. Application Data

(60) Provisional application No. 61/623,014, filed on Apr. 11, 2012.

(51) Int. Cl.

| | | |
|---|---|---|
| *F01D 9/00* | (2006.01) | |
| *F03D 11/00* | (2006.01) | |
| *F01D 1/02* | (2006.01) | |
| *F03B 1/04* | (2006.01) | |
| *F03B 3/16* | (2006.01) | |
| *F03D 1/04* | (2006.01) | |
| *F03D 3/04* | (2006.01) | |
| *F04D 29/44* | (2006.01) | |
| *F04D 29/54* | (2006.01) | |
| *F04D 29/60* | (2006.01) | |
| *F16M 13/02* | (2006.01) | |

(52) U.S. Cl.
CPC .............. *F04D 29/602* (2013.01); *F16M 13/02* (2013.01)
USPC ...... 415/190; 415/189; 415/209.4; 415/210.1; 248/675; 248/201; 248/223.41; 310/91

(58) Field of Classification Search
CPC ....................................... H02K 5/00
USPC ........... 248/674, 675, 201, 223.41, 310, 315; 310/91; 415/189, 190, 209.4, 210.1; 417/348–363; 361/679.46–679.54, 361/688–723

See application file for complete search history.

(56) References Cited

U.S. PATENT DOCUMENTS

| | | | | |
|---|---|---|---|---|
| 2,959,388 | A * | 11/1960 | Fogle ......................... | 248/230.9 |
| 3,127,092 | A * | 3/1964 | Shenberger .................. | 417/353 |
| 3,536,280 | A * | 10/1970 | Barlow ........................ | 248/676 |
| 3,790,114 | A * | 2/1974 | Italiano et al. ............... | 248/675 |
| 4,019,704 | A * | 4/1977 | Levine ........................ | 248/637 |
| 4,076,197 | A * | 2/1978 | Dochterman ................ | 248/604 |
| 4,155,528 | A * | 5/1979 | Dawson ...................... | 248/674 |
| 4,161,667 | A * | 7/1979 | Buckman et al. ............. | 310/51 |
| 4,171,937 | A * | 10/1979 | Greenfield ............... | 417/423.15 |
| 4,394,111 | A * | 7/1983 | Wiese et al. ................. | 417/360 |
| 4,473,764 | A * | 9/1984 | White ............................ | 310/91 |
| 4,636,673 | A * | 1/1987 | McDonald ................... | 310/91 |
| 5,069,415 | A * | 12/1991 | Mechalas ..................... | 248/674 |
| 5,399,069 | A * | 3/1995 | Marey et al. ............... | 415/209.3 |
| 5,660,367 | A * | 8/1997 | Rush ............................ | 248/674 |
| 6,987,336 | B2 * | 1/2006 | Streng et al. .................. | 310/51 |
| 2006/0091751 | A1 * | 5/2006 | Gaul ............................. | 310/91 |

* cited by examiner

*Primary Examiner* — Terrell McKinnon
*Assistant Examiner* — Michael McDuffie
(74) *Attorney, Agent, or Firm* — Damon M. Thurston

(57) ABSTRACT

A rigid mechanical self-centering assembly for a component mounted relative to an opening. Variable radii cylindrical components are accommodated by virtue of variable-length, rigid, structural stays, and flexible mounts with curved faces for flush abuttal to said component, such as a motor or pump. A high efficiency assembly for electrical components is achieved by use of nonferrous materials.

10 Claims, 9 Drawing Sheets

ASSEMBLY FOR MOUNTING A COMPONENT CENTERED TO AN OPENING

CROSS-REFERENCE TO RELATED APPLICATIONS

This non-provisional application claims a priority filing date of Apr. 11, 2012 pursuant to provisional application No. 61/623,014.

STATEMENT REGARDING FEDERALLY SPONSORED RESEARCH OR DEVELOPMENT

N/A

NAMES OF PARTIES TO JOINT RESEARCH AGREEMENT

N/A

REFERENCE TO SEQUENCE LISTING

N/A

FIELD OF THE INVENTION

This invention pertains to the field of mechanical structures with respect to component mounting, and with specific application to the field of ventilation, high efficiency ventilation and solar cooling. The field of invention also relates to self-centering structural mounts for securing components, such as motors, fans, bearings or other cylindrical components, relative to apertures, portals, ducts, vents, airways or other openings with discrete centers.

BRIEF SUMMARY OF THE INVENTION

This invention pertains to mechanically affixing and/or securing mounted components relative to apertures, portals, ducts, vents, airways or other openings with discrete centers. The invention further pertains to self-centering assemblies relative to such openings. In one embodiment of the inventive concept, said mounted component may have a curved surface. In a further embodiment, said mounted component may have a cylindrical casing or surface, such as a motor casing, a bearing or a motorized fan. In such embodiments, the inventive concept embraces the fixed mounting of cylindrical components of various radii by virtue of variable-length, rigid, structural stays, and flexible mounts with curved faces for abutting variable component sizes. In said embodiments, the fixed mounting of said component is typically centered relative to the aforementioned vent, airway or other similar opening.

In a further embodiment, the inventive concept may be applied where a magnetically neutral local environment is desired by the use of nonferrous materials. In such an embodiment, the invention may be practiced in the context of a high-efficiency ventilation or pumping system. In one specific embodiment, the inventive concept may be used to mount a fan motor or other cylindrical component central to an aperture by way of radial structural stays connecting said motor to an assembly having said aperture.

An embodiment of the inventive concept may further include semi-flexible mounts with curved faces and receiving slots that interface between, and rigidly affix, structural stays to said cylindrical component. The semi-flexible character of said mounts allows the curved faces of said mounts to achieve flush contact with components of various radii. In said embodiments, the structural stays, mounts, and mounted component form a light-weight, rigid assembly mounted relative to an aperture, portal, duct, vent, airway or other opening.

DETAILED DESCRIPTION OF THE INVENTION

Figure 1:
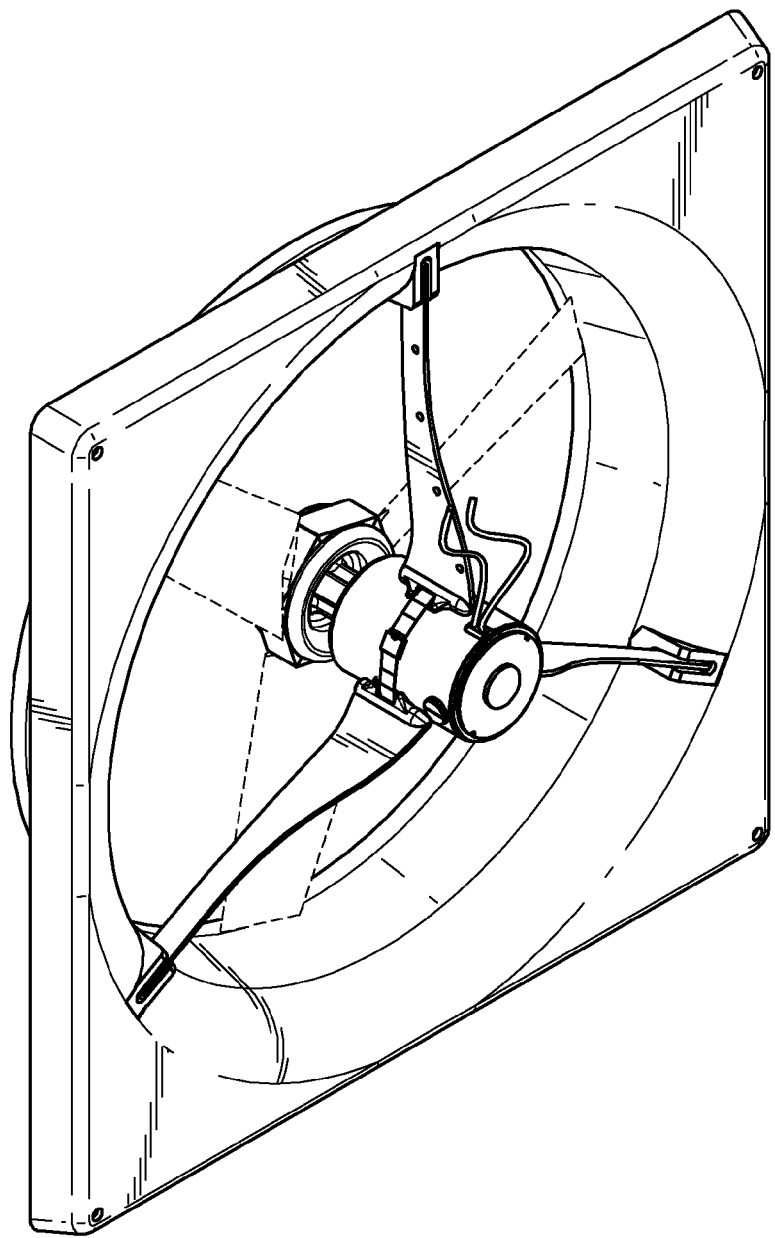
FIG. 1 is a three-quarter view of an assembly for mounting a cylindrical component centered relative to a vent.
Figure 2:
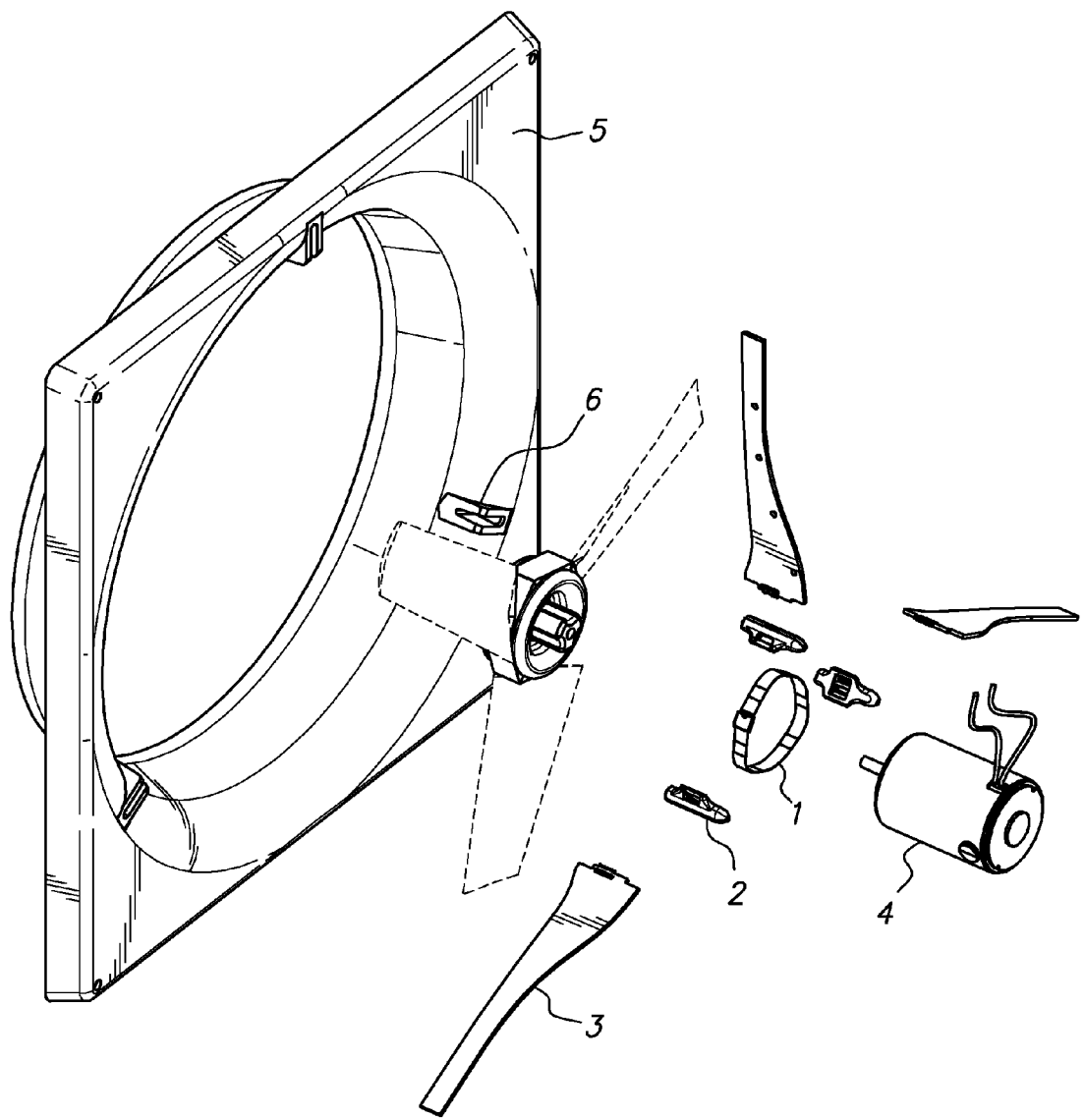
FIG. 2 is a three-quarter exploded view of an assembly for mounting a cylindrical component centered relative to a vent.
Figure 3:
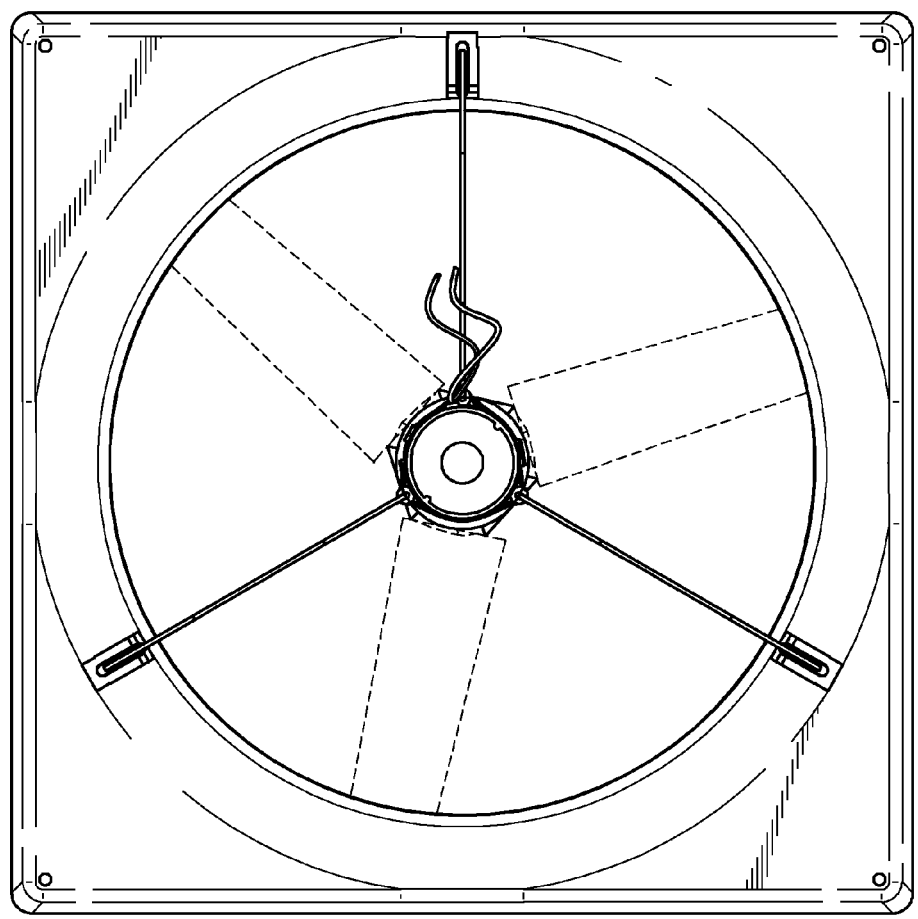
FIG. 3 is a forward view of an assembly for mounting a cylindrical component centered relative to a vent.
Figure 4:
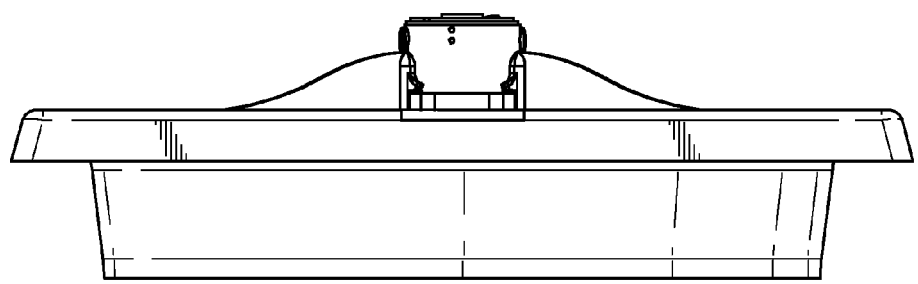
FIG. 4 is an overhead view of an assembly for mounting a cylindrical component centered relative to a vent.
Figure 5:
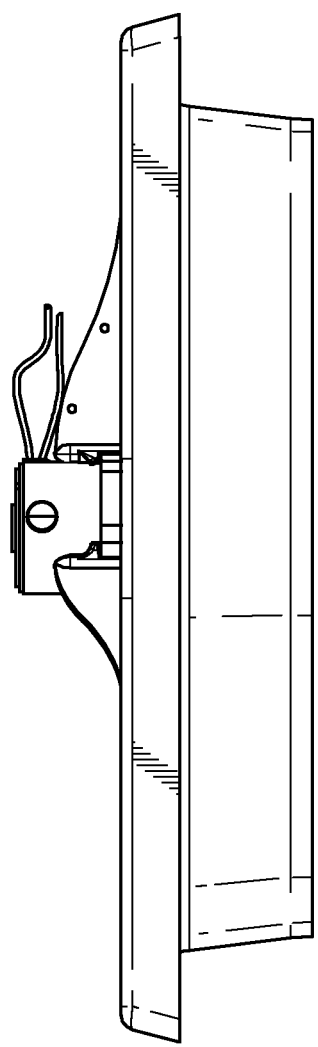
FIG. 5 is a lateral view of an assembly for mounting a cylindrical component centered relative to a vent.
Figure 6:
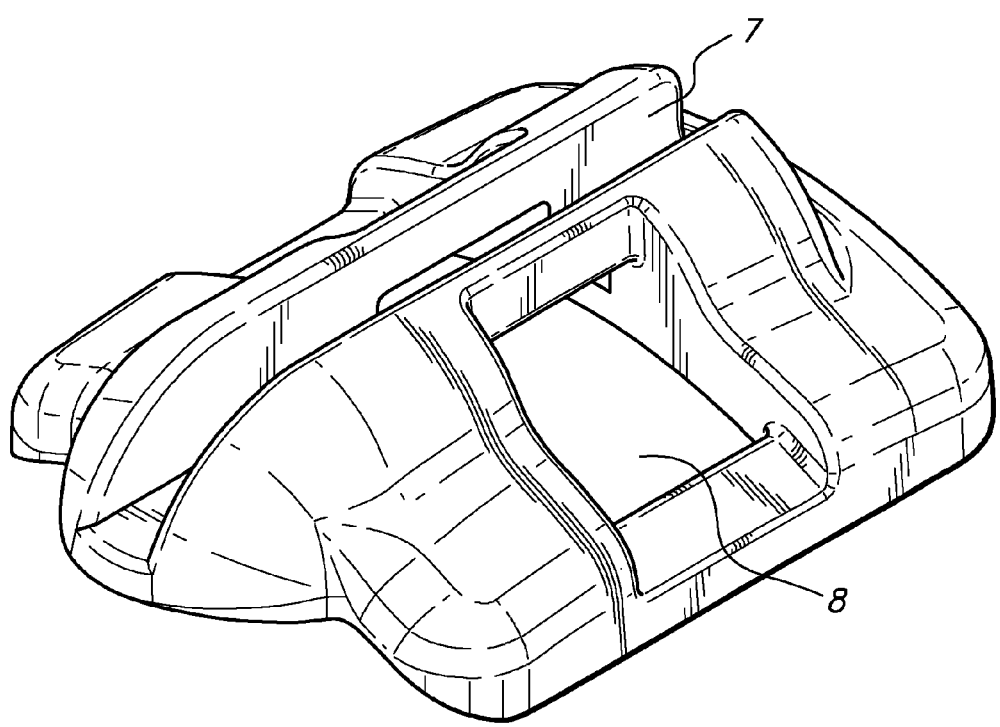
FIG. 6 is a three-quarter view of a semi-flexible mount with a curved face which, in the current inventive concept, is a component part of an assembly for mounting a cylindrical component centered relative to a vent.
Figure 7:
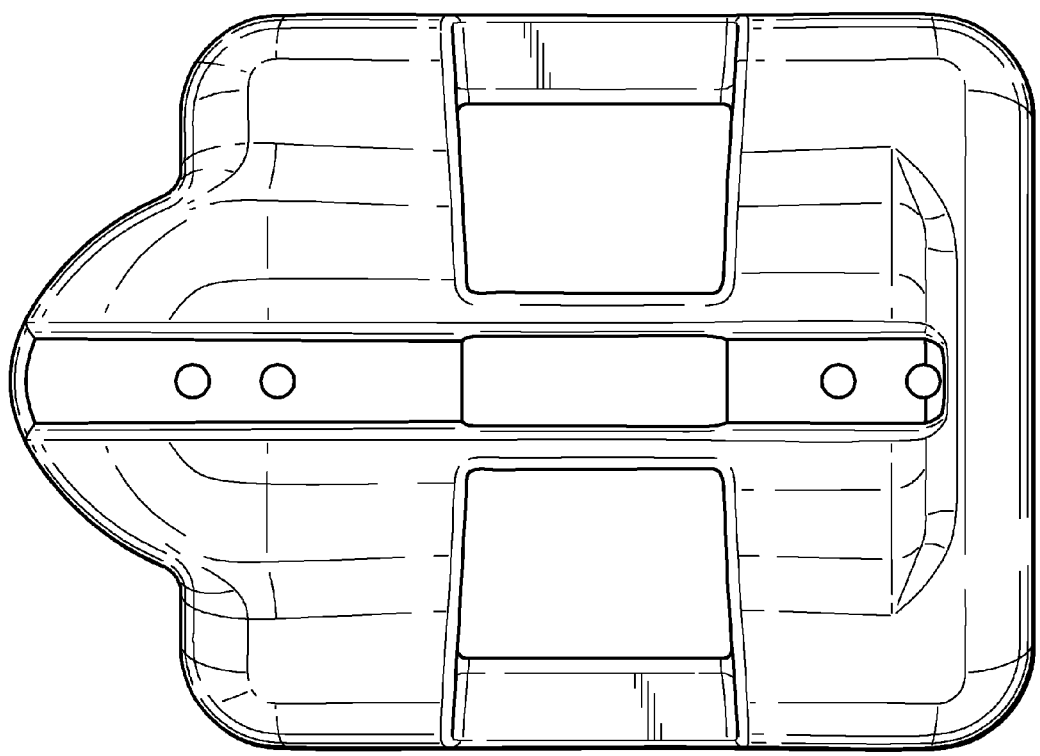
FIG. 7 is an overhead view of a semi-flexible mount with a curved face which, in the current inventive concept, is a component part of an assembly for mounting a cylindrical component centered relative to a vent.
Figure 8:
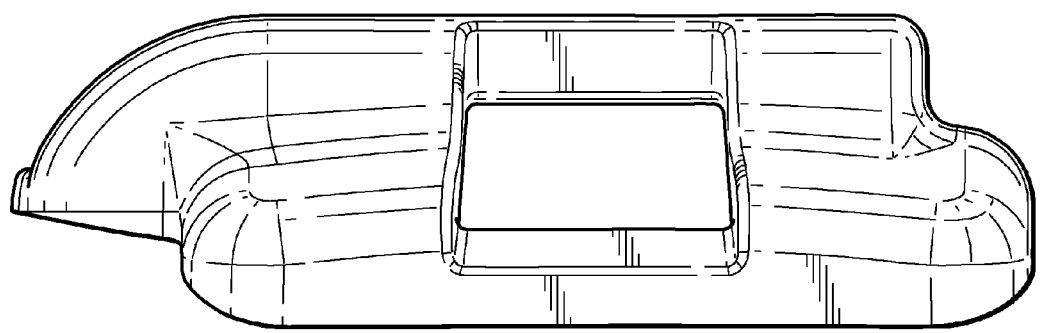
FIG. 8 is a lateral view of a semi-flexible mount with a curved face which, in the current inventive concept, is a component part of an assembly for mounting a cylindrical component centered relative to a vent.
Figure 9:
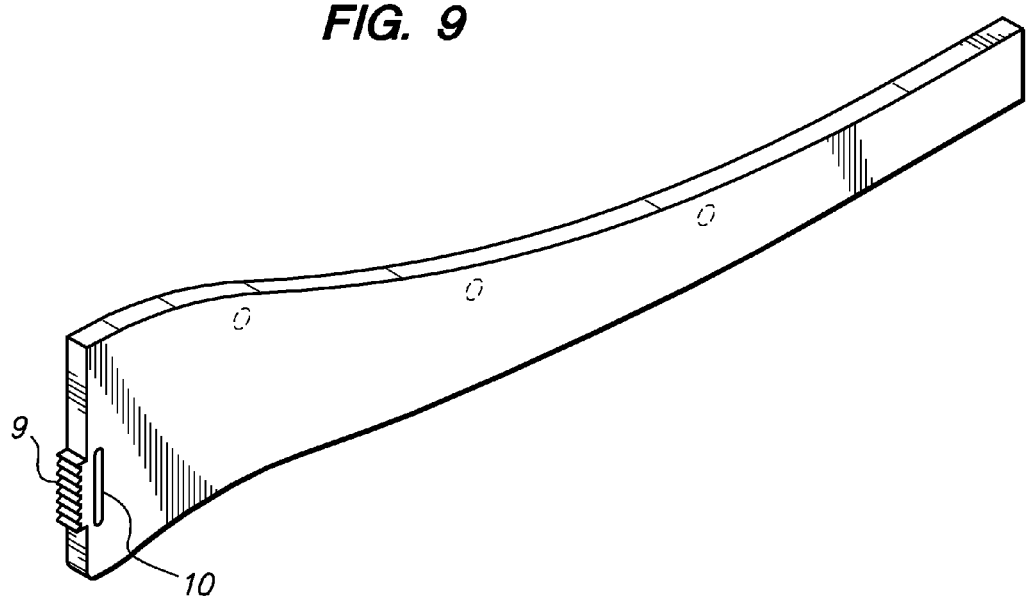
FIG. 9 is a three-quarter view of a structural stay which, in the current inventive concept, is a component part of an assembly for mounting a cylindrical component centered relative to a vent.
Figure 10:
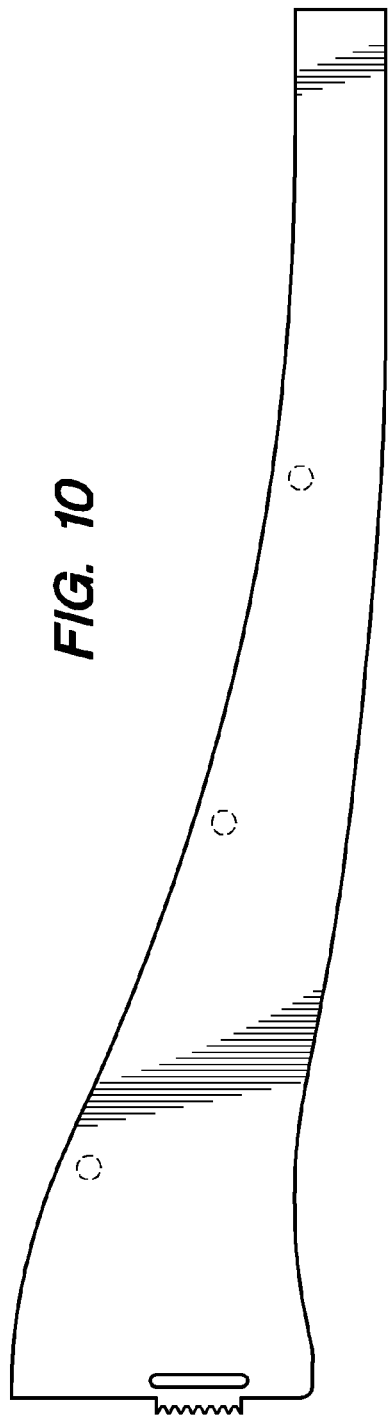
FIG. 10 is a lateral view of a structural stay which, in the current inventive concept, is a component part of an assembly for mounting a cylindrical component centered relative to a vent.
Figure 11:
FIG. 11 is an under-side view of a structural stay which, in the current inventive concept, is a component part of an assembly for mounting a cylindrical component centered relative to a vent.
Figure 12:
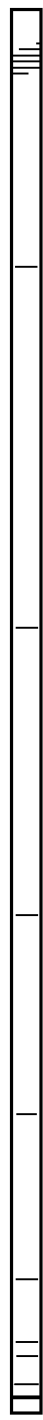
FIG. 12 is an over-head view of a structural stay which, in the current inventive concept, is a component part of an assembly for mounting a cylindrical component centered relative to a vent.
Figure 13:
FIG. 13 is an end view of a structural stay which, in the current inventive concept, is a component part of an assembly for mounting a cylindrical component centered relative to a vent.
Figure 14:
FIG. 14 is am end view of a structural stay which, in the current inventive concept, is a component part of an assembly for mounting a cylindrical component centered relative to a vent.

As depicted in FIGS. 1 and 2, one embodiment of the inventive concept is comprised of: a semi-rigid band or strap (1) having a buckle or other tensioner for fixedly closing said band or strap about the component (4) being centrally mounted over a frame (5) having an aperture, portal, duct, vent, airway or other opening; an array of three or more mounts (2), each having a curved face for abutting the surface of said component, a central female opening and a rigid receptacle structure about said opening as shown in FIGS. 6-8, (7) and (8); and an array of radially extending structural stays shown in FIG. 2 (3), each having one end for engaging said mount's receptacle (7) and abutting said component's surface, and a second radially extending end for fixedly engaging slot (6) on frame (5) having an aperture, portal, duct, vent, airway or other opening with a discrete center. Said radially extending end may engage receiving slots (6) in frame (5) about said vent or opening, resulting in a fixed assembly with said frame (5). Said tension strap or belt (1) is to be affixed about said component (4) and through contiguous slots in said mounts (2) and stays (3), held in place by a buckle, clasp, tensioner or other retention means. As depicted in FIGS. 9 and 10, said structural stays (2) may have teeth, grooves or other structural features (9) on the end which engages with the surface or casing of the cylindrical central component, and which prohibit movement of the central component. Further, when said tension strap (1) is locked into place though slot (10) in said stay, and through tunnel (8), the various elements form a rigid assembly that may be mechanically or otherwise rigidly affixed as desired, for instance over any frame (5) having an aperture (5) or opening.

The benefits of this configuration over the prior art are manifold. First, because the assembly does not require bolts or other mechanical attachment directly into the component, replacement of the component can be had relatively quickly and with few steps. In this regard, a component such as a motor, bearing or fan that may eventually require replacement due to fatigue is easily replaced. In addition, by substituting stays of longer or shorter length, a new or replacement component with a different radius is quickly and easily accommodated within the rigid assembly. This is inherently beneficial in the context of advanced ventilation systems where new components, such as newer, higher-efficiency motors are regularly foreseeable and essential to optimal ventilation and/or cooling.

As depicted in the attached figures, a cylindrical component, such as a fan motor, may be centrally mounted over an aperture by employing an embodiment of the inventive concept. In one embodiment, the inventive concept may include a central cylindrical component, such as a fan motor, to be rigidly affixed. Three or more equally spaced mounts abut said cylindrical component. Each mount may have a curved face with a substantially similar radius of curvature as that of the cylindrical component, resulting in a flush footing. The mounts may be composed of a semi-flexible or rigid material, depending upon the inner face's radius of curvature relative to the cylindrical component. In addition, each mount may have a central female opening for receiving and affixing a structural stay. Said female opening may allow a complete pass through of a structural stay such that the stays end abuts the cylindrical component. Each mount may receive a structural stay having two ends; one for interfacing with said component and mount and one for rigidly attaching to said aperture frame assembly. Each structural stay may have an end associated with the cylindrical component that has grooves, teeth, ridges, or other facial treatment that, when in contact with the cylindrical component, prevents movement of the component along the component's axis. Said mounts and said structural stays may have contiguous slot openings that allow the pass through of a belt or strap parallel to the cylindrical component's curved surface, and perpendicular to the component's central axis.

In one possible embodiment of the inventive concept, as depicted in the attached figures, said belt or strap may be tightened and held in place by a buckle, clasp or other tension device, rendering the cylindrical component, the mounts, and the structural stays a rigid assembly. The radially extended ends of said stays may then be mechanically or structurally affixed to the aperture assembly in a variety of manners, all equally known to those reasonably skilled in the art. In the depicted embodiment, the stays affix to slots in a frame with a central vent.

In applications of inventive concept where a nonmagnetic or neutral electromagnetic field in the local environment surrounding said component is desired, such as applications where high efficiency (low/no additional electrical resistance) is required of the central component, such as a fan motor, the mounts, structural stays, strap or belt and fastener (e.g., buckle, clasp, etc.) may be comprised of nonferrous materials such as aluminum, synthetics, polymers or other materials known by those reasonably skilled in the art. In this embodiment, the mounting assembly itself creates an electromagnetically neutral local environment surrounding the component, thereby allowing the component (e.g., motor, pump or other electrically driven component) to operate at its highest efficiency.

I claim:

1. An self-centering rigid assembly for mounting a component over an opening, comprising:
    a. A frame having a central opening and at least two slots equilaterally distributed about the rim of said opening;
    b. At least two structural stays of identical shape each having a first end for fixedly engaging a corresponding slot about the rim of said opening, a second end for contacting said component and a slot through said stay proximate to said second end, where said stays extend radially from said slots about said rim into said opening;
    c. At least two mounts, each associated with a corresponding stay, for securing said stay to said component; each having a curved face for establishing a flush contact with said component, a female receptacle for receiving said second end of a corresponding stay, and a tunnel orthogonal to said female receptacle and parallel to the surface of said component, where said orthogonal tunnel on each mount aligns with said slot in each associated structural stay; and
    d. A semi-rigid strap for securing said stays and mounts to said component, having means for fixedly closing said strap about said component, where said strap passes through the orthogonal tunnels of each mount and said slots on each stay.

2. The rigid assembly of claim 1 wherein the number of slots about said rim is three.

3. The rigid assembly of claim 1 wherein the number of structural stays is three.

4. The rigid assembly of claim 2 wherein the number of mounts is three.

5. The rigid assembly of claim 1 wherein components of varying radii may be accommodated by varying the length of said stays.

6. The rigid assembly of claim 1 wherein said stays are substantially flat.

7. The rigid assembly of claim 1 wherein said second ends of said stays are grooved for increased friction against the surface of said component.

8. The rigid assembly of claim 1 wherein said mounts are composed of semi-flexible material, allowing said mounts' curved face to achieve flush engagement with components of varied radii.

9. The rigid assembly of claim 1 wherein said stays, mounts and strap are composed of nonferrous materials.

10. An self-centering rigid assembly for mounting a component over an opening, comprising:
    a. Three structural stays of identical shape, each having a first end for fixedly engaging said opening, a second end for contacting said component and a slot through said stay proximate to said second end, where said stays extend radially into said opening;
b. Three mounts, each associated with a corresponding stay, for securing said stay to said component; each having a curved face for establishing a flush contact with said component, a female receptacle for receiving said second end of a corresponding stay, and a tunnel orthogonal to said female receptacle and parallel to the surface of said component, where said orthogonal tunnel on each mount aligns with said slot in each associated structural stay; and
c. A semi-rigid strap for securing said stays and mounts to said component, having means for fixedly closing said strap about said component, where said strap passes through the orthogonal tunnels of each mount and said slots on each stay.

\* \* \* \* \*